United States Patent
Klesczewski et al.

(10) Patent No.: US 10,106,641 B2
(45) Date of Patent: Oct. 23, 2018

(54) MIXTURES OF POLYETHER CARBONATE POLYOLS AND POLYETHER POLYOLS FOR PRODUCING POLYURETHANE SOFT FOAMS

(71) Applicant: Covestro Deutschland AG, Leverkusen (DE)

(72) Inventors: Bert Klesczewski, Köln (DE); Kai Laemmerhold, Weisenheim am Berg (DE); Jörg Hofmann, Krefeld (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/038,486

(22) PCT Filed: Nov. 24, 2014

(86) PCT No.: PCT/EP2014/075357
§ 371 (c)(1),
(2) Date: May 23, 2016

(87) PCT Pub. No.: WO2015/078801
PCT Pub. Date: Jun. 4, 2015

(65) Prior Publication Data
US 2016/0297919 A1    Oct. 13, 2016

(30) Foreign Application Priority Data

Nov. 27, 2013 (EP) .................................. 13194565
Aug. 29, 2014 (EP) .................................. 14182770

(51) Int. Cl.
| | |
|---|---|
| C08G 18/40 | (2006.01) |
| C08G 18/48 | (2006.01) |
| C08G 18/44 | (2006.01) |
| C08G 18/08 | (2006.01) |
| C08G 18/76 | (2006.01) |
| C08J 9/00 | (2006.01) |
| C08G 101/00 | (2006.01) |

(52) U.S. Cl.
CPC ......... *C08G 18/4018* (2013.01); *C08G 18/14* (2013.01); *C08G 18/44* (2013.01); *C08G 18/4804* (2013.01); *C08G 18/4866* (2013.01); *C08G 18/7621* (2013.01); *C08J 9/00* (2013.01); *C08G 2101/0008* (2013.01); *C08G 2101/0083* (2013.01); *C08J 2205/06* (2013.01); *C08J 2375/08* (2013.01)

(58) Field of Classification Search
CPC .... C08G 18/14; C08G 18/4018; C08G 18/44; C08G 18/4804; C08G 18/4866; C08G 18/7621; C08G 2101/0008; C08G 2101/0083; C08J 9/00; C08J 2205/06; C08J 2375/08
See application file for complete search history.

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 4,644,017 A | 2/1987 | Haas et al. | |
| 5,158,922 A | 10/1992 | Hinney et al. | |
| 5,470,813 A | 11/1995 | Le-Khac | |
| 6,096,238 A | 8/2000 | Lutter et al. | |
| 6,762,278 B2 | 7/2004 | Hinz et al. | |
| 6,767,986 B2 | 7/2004 | Moethrath et al. | |
| 7,008,900 B1 | 3/2006 | Hofmann et al. | |
| 8,247,467 B2 | 8/2012 | Mijolovic et al. | |
| 8,324,419 B2 | 12/2012 | Mijolovic et al. | |
| 2006/0223973 A1* | 10/2006 | Hinz .................. | C08G 64/34 528/196 |
| 2009/0239964 A1 | 9/2009 | Sasaki et al. | |
| 2013/0190462 A1* | 7/2013 | Wolf .................. | C08G 65/2603 526/64 |
| 2013/0296450 A1 | 11/2013 | Hofmann et al. | |
| 2014/0107245 A1 | 4/2014 | Hofmann et al. | |
| 2014/0323670 A1* | 10/2014 | Muller .................. | C08G 64/34 526/64 |

FOREIGN PATENT DOCUMENTS

| | | |
|---|---|---|
| CA | 1337448 C | 10/1995 |
| EP | 0 176 013 A2 | 4/1986 |
| EP | 0 222 453 A2 | 5/1987 |
| EP | 355000 A1 | 2/1990 |
| EP | 0700949 A2 | 3/1996 |
| EP | 0743093 A1 | 11/1996 |
| EP | 0761708 A2 | 3/1997 |
| EP | 1359177 A1 | 11/2003 |
| EP | 2115032 A1 | 11/2009 |
| EP | 2530101 A1 | 12/2012 |
| WO | WO-97/40086 A1 | 10/1997 |
| WO | WO-98/16310 A1 | 4/1998 |
| WO | WO-00/47649 A1 | 8/2000 |
| WO | WO-2008/013731 A1 | 1/2008 |
| WO | WO-2008/058913 A1 | 5/2008 |
| WO | WO-2008092767 A1 | 8/2008 |
| WO | WO-2012/080192 A1 | 6/2012 |
| WO | WO-2012/163944 A1 | 12/2012 |

OTHER PUBLICATIONS

International Search Report for PCT/EP2014/075357 dated Jan. 19, 2015.
Third Party Observation for PCT/EP2014/075357 dated Mar. 22, 2016.

* cited by examiner

*Primary Examiner* — John Cooney
(74) *Attorney, Agent, or Firm* — K&L Gates LLP

(57) ABSTRACT

The invention relates to a method for producing polyurethane soft foam by reacting an isocyanate component with a component which is reactive towards isocyanates. The component which is reactive towards isocyanates comprises a mixture of at least one polyether carbonate polyol and a polyether polyol as the constituents. In the component which is reactive towards isocyanates, the total proportion of polyether carbonate polyols is =20 wt. % to =80 wt. % and the total proportion of polyether polyol is =20 wt. % to =80 wt. %, based on the total weight of the provided polyols. The invention further relates to a polyurethane soft foam produced using said method.

15 Claims, No Drawings

MIXTURES OF POLYETHER CARBONATE POLYOLS AND POLYETHER POLYOLS FOR PRODUCING POLYURETHANE SOFT FOAMS

CROSS-REFERENCE TO RELATED APPLICATIONS

This application is a national stage application (under 35 U.S.C. § 371) of PCT/EP2014/075357, filed Nov. 24, 2014, which claims benefit of European Application Nos. 13194565.1, filed Nov. 27, 2013, and 14182770.9, filed Aug. 29, 2014, all of which are incorporated herein by reference in their entirety.

The present invention relates to a process for producing flexible polyurethane foams by reaction of an isocyanate component with a component reactive toward isocyanates, wherein the component reactive toward isocyanates comprises, as constituents, a polyether polyol and a polyether carbonate polyol. The invention further relates to flexible polyurethane foams produced by the process of the invention.

EP-A 222453 describes the production of flexible polyurethane foams from pure polyether carbonate polyols.

U.S. Pat. No. 6,762,278 describes production of flexible polyurethane foams from pure polyether carbonate polyols.

WO-A 2008/058913 describes the production of flexible polyurethane foams from polyether carbonate polyols, wherein the polyether carbonate polyols have, at the chain end, a block of pure alkylene oxide units, especially a block of pure propylene oxide units.

WO-A 2012/163944 discloses the production of flexible polyurethane foams from polyether carbonate polyols having, at the chain end, a mixed block ("terminal mixed block") composed of at least two alkylene oxides. The flexible polyurethane foams according to the teaching of WO-A 2012/163944 are preferably produced from pure polyether carbonate polyols.

Compared to conventional polyether polyols, it is more difficult to process polyether carbonate polyols to give flexible polyurethane foams, which is manifested, for example, in poorer flow characteristics. It is additionally desirable to obtain flexible polyurethane foams based on polyether carbonate polyols having improved mechanical properties compared to flexible polyurethane foams based on conventional polyether polyols.

In the context of an environmentally friendly setup of production processes, it is generally desirable to use $CO_2$-based starting materials in relatively large amounts. It is therefore an object of the present invention to provide a process for producing flexible polyurethane foams having a high proportion of polyether carbonate polyols, wherein the processing of the starting materials and the final properties of the polyurethane foams can be improved.

This object was surprisingly achieved by a process for producing flexible polyurethane foams in which the isocyanate-reactive compound comprises a mixture of $\geq 20$ to $\leq 80\%$ by weight of a polyether carbonate polyol and $\leq 80$ to $\geq 20\%$ by weight of a conventional polyether polyol.

The invention therefore provides a process for producing flexible polyurethane foams by reaction of an isocyanate component with a component reactive toward isocyanates, wherein the component reactive toward isocyanates comprises the following constituents:

A) $\geq 20$ to $\leq 80\%$ by weight, preferably $\geq 50$ to $\leq 80\%$ by weight, more preferably $\geq 55$ to $\leq 80\%$ by weight of a polyether carbonate polyol having a hydroxyl number to DIN 53240 of $\geq 20$ mg KOH/g to $\leq 250$ mg KOH/g, obtainable by copolymerization of $\geq 2\%$ by weight to $\leq 30\%$ by weight of carbon dioxide and $\geq 70\%$ by weight to $\leq 98\%$ by weight of one or more alkylene oxides, in the presence of one or more 1H-functional starter molecules having an average functionality of $\geq 1$ to $\leq 6$, preferably of $\geq 1$ and $\leq 4$, more preferably $\geq 2$ and $\leq 3$, where the polyether carbonate polyol does not have any terminal alkylene oxide blocks, B) $\leq 80$ to $\geq 20\%$ by weight, preferably $\leq 50$ to $\geq 20\%$ by weight, more preferably $\leq 45$ to $\geq 20\%$ by weight of a polyether polyol having a hydroxyl number to DIN 53240 of $\geq 20$ mg KOH/g to $\leq 250$ nag KOH/g, the polyether polyol being free of carbonate units.

It has been found that the starting materials have better processability in the process of the invention. The flexible polyurethane foams produced by the process of the invention therefore have improved flow characteristics. In addition, the flexible polyurethane foams produced by the process of the invention feature good mechanical properties. The invention further provides the flexible polyurethane foams produced by the process of the invention.

The flexible polyurethane foams, preferably flexible slabstock polyurethane foams, are produced by known methods. The components described in detail hereinafter can be used for production of the flexible polyurethane foams.

Component A) comprises a polyether carbonate polyol having a hydroxyl number (OH number) to DIN 53240 of $\geq 20$ mg KOH/g to $\leq 250$ mg KOH/g, preferably of $\geq 20$ mg KOH/g to $\leq 150$ mg KOH/g, more preferably of $\geq 25$ mg KOH/g to $\leq 90$ mg KOH/g, which is obtainable by copolymerization of $\geq 2\%$ by weight to $\leq 30\%$ by weight of carbon dioxide and $\geq 70\%$ by weight to $\leq 98\%$ by weight of one or more alkylene oxides, in the presence of one or more H-functional starter molecules having an average functionality of $\geq 1$ to $\leq 6$, preferably of $\geq 1$ and $\leq 4$, more preferably $\geq 2$ and $\leq 3$, where the polyether carbonate polyol does not have any terminal alkylene oxide blocks. "H-functional" is understood in the context of the invention to mean a starter compound having hydrogen atoms active with respect to alkoxylation.

Preferably, the copolymerization of carbon dioxide and one or more alkylene oxides is effected in the presence of at least one DMC catalyst (double metal cyanide catalyst).

Preferably, the polyether carbonate polyols used in accordance with the invention also have ether groups between the carbonate groups, which is shown schematically in formula (VIII). In the scheme of formula (VIII), R is an organic radical such as alkyl, alkylaryl or aryl, which may in each case also contain heteroatoms, for example O, S, Si, etc.; e and f are integers. The polyether carbonate polyol shown in the scheme of formula (VIII) shall merely be understood such that blocks having the structure shown may in principle be present in the polyether carbonate polyol, but the sequence, number and length of the blocks can vary and is not limited to the polyether carbonate polyol shown in formula (VIII). In relation to formula (VIII), this means that the ratio of e/f is preferably from 2:1 to 1:20, more preferably from 1.5:1 to 1:10.

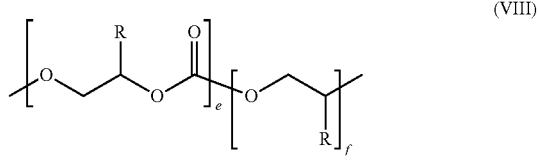

In a preferred embodiment of the invention, the polyether carbonate polyol A) has a content of carbonate groups ("units originating from carbon dioxide"), calculated as $CO_2$, of ≥2.0% and ≤30.0% by weight, preferably of ≥5.0% and ≤28.0% by weight and more preferably of ≥10.0% and ≤25.0% by weight.

The proportion of $CO_2$ incorporated ("units originating from carbon dioxide") in a polyether carbonate polyol can be determined from the evaluation of characteristic signals in the $^1H$ NMR spectrum. The example which follows illustrates the determination of the proportion of units originating from carbon dioxide in an octane-1,8-diol-started $CO_2$/propylene oxide polyether carbonate polyol.

The proportion of $CO_2$ incorporated in a polyether carbonate polyol and the ratio of propylene carbonate to polyether carbonate polyol can be determined by $^1H$ NMR (a suitable instrument is from Bruker, DPX 400, 400 MHz; zg30 pulse program, delay time d1: 10 s, 64 scans). Each sample is dissolved in deuterated chloroform. The relevant resonances in the $^1H$ NMR (based on TMS=0 ppm) are as follows:

Cyclic carbonate (which was formed as a by-product) having a resonance at 4.5 ppm; carbonate resulting from carbon dioxide incorporated in the polyether carbonate polyol having resonances at 5.1 to 4.8 ppm; unreacted propylene oxide (PO) having a resonance at 2.4 ppm; polyether polyol (i.e. without incorporated carbon dioxide) having resonances at 1.2 to 1.0 ppm; the octane-1,8-diol incorporated as starter molecule (if present) having a resonance at 1.6 to 1.52 ppm.

The mole fraction of the carbonate incorporated in the polymer in the reaction mixture is calculated as per formula (I) as follows, using the following abbreviations:

$A(4.5)$=area of the resonance at 4.5 ppm for cyclic carbonate (corresponds to a hydrogen atom)
$A(5.1-4.8)$=area of the resonance at 5.1–4.8 ppm for polyether carbonate polyol and a hydrogen atom for cyclic carbonate
$A(2.4)$=area of the resonance at 2.4 ppm for free, unreacted PO
$A(1.2-1.0)$=area of the resonance at 1.2-1.0 ppm for polyether polyol
$A(1.6-1.52)$=area of the resonance at 1.6 to 1.52 ppm for octane-1,8-diol (starter), if present.

Taking account of the relative intensities, the values for the polymer-bound carbonate ("linear carbonate" LC) in the reaction mixture were converted to mol % by the following formula (I):

$$LC = \frac{A(5.1-4.8) - A(4.5)}{A(5.1-4.8) + A(2.4) + 0.33*A(1.2-1.0) + 0.25*A(1.6-1.52)} * 100 \quad (I)$$

The proportion by weight (in % by weight) of polymer-bound carbonate (LC') in the reaction mixture was calculated by formula (II)

$$LC = \frac{[A(5.1-4.8) - A(4.5)]*102}{N} * 100\% \quad (II)$$

where the value of N ("denominator" N) is calculated by formula (II):

$$N=[A(5.1-4.8)-A(4.5)]*102+A(4.5)*102+A(2.4)*58+0.33*A(1.2-1.0)*58+0.25*A(1.6-1.52)*146 \quad (III)$$

The factor of 102 results from the sum of the molar masses of $CO_2$ (molar mass 44 g/mol) and of propylene oxide (molar mass 58 g/mol), the factor of 58 results from the molar mass of propylene oxide, and the factor of 146 results from the molar mass of the octane-1,8-diol starter used (if present).

The proportion by weight (in % by weight) of cyclic carbonate (CC') in the reaction mixture was calculated by formula (IV):

$$CC = \frac{A(4.5)*102}{N} * 100\% \quad (IV)$$

where the value of N is calculated by formula (III).

In order to calculate the composition based on the polymer component (consisting of polyether polyol which has been formed from starter and propylene oxide during the activation steps which take place under $CO_2$-free conditions, and polyether carbonate polyol formed from starter, propylene oxide and carbon dioxide during the activation steps which take place in the presence of $CO_2$ and during the copolymerization) from the values for the composition of the reaction mixture, the non-polymeric constituents of the reaction mixture (i.e. cyclic propylene carbonate and any unconverted propylene oxide present) were mathematically eliminated. The proportion by weight of the repeat carbonate units in the polyether carbonate polyol was converted to a proportion by weight of carbon dioxide using the factor F=44/(44+58). The value for the $CO_2$ content in the polyether carbonate polyol is normalized to the proportion of the polyether carbonate polyol molecule which was formed in the copolymerization and any activation steps in the presence of $CO_2$ (i.e. the proportion of the polyether carbonate polyol molecule resulting from the starter (octane-1,8-diol, if present) and from the reaction of the starter with epoxide added under $CO_2$-free conditions was not taken into account here).

For example, polyether carbonate polyols as per A) are obtainable by:
(α) an H-functional starter substance or a mixture of at least two H-functional starter substances is initially charged and any water and/or other volatile compounds are removed by elevated temperature and/or reduced pressure ("drying"), with addition of the DMC catalyst to the H-functional starter substance or to the mixture of at least two H-functional starter substances before or after the drying,
(β) activation is accomplished by adding a portion (based on the total amount of alkylene oxides used in the activation and copolymerization) of one or more alkylene oxides to the mixture resulting from, step (α), where this portion of alkylene oxide may optionally be added in the presence of $CO_2$ and where the temperature spike ("hotspot") which then occurs due to the exothermic chemical reaction that follows and/or a pressure drop in the reactor is awaited in each case, and where step (β) for activation may also be repeated,
(γ) one or more of the alkylene oxides and carbon dioxide are added to the mixture resulting from step (β), where the alkylene oxides used in step (γ) may be the same as or different than the alkylene oxides used in step (β), and where no further alkoxylation step follows on after step (γ).

In general, for preparation of the polyether carbonate polyols, alkylene oxides (epoxides) having 2 to 24 carbon atoms may be used. The alkylene oxides having 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. The alkylene oxides used are preferably ethylene oxide and/or propylene oxide and/or 1,2-butylene oxide, more preferably propylene oxide.

In a preferred embodiment of the invention, the proportion of ethylene oxide in the total amount of propylene oxide and ethylene oxide used is ≥0 and ≤90% by weight, preferably ≥0 and ≤50% by weight and is more preferably free of ethylene oxide.

Suitable H-functional starter substances used may be compounds having hydrogen atoms active in respect of the alkoxylation. Groups active in respect of the alkoxylation and having active hydrogen atoms are, for example, —OH, —NH$_2$ (primary amines), —NH— (secondary amines), —SH, and —CO$_2$H, preferably —OH and —NH$_2$, more preferably —OH, H-functional starter substances used are, for example, one or more compounds selected from the group consisting of water, mono- or polyhydric alcohols, polyfunctional amines, polyhydric thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines (for example the products called Jeffamines® from Huntsman, for example D-230, D-400, D-2000, T-403, T-3000, T-5000 or corresponding BASF products, for example Polyetheramine D230, D400, D200, T403, T5000), polytetrahydrofurans (e.g. PolyTHF® from BASF, for example PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$-alkyl fatty acid esters containing an average of at least 2 OH groups per molecule. By way of example, the $C_1$-$C_{24}$-alkyl fatty acid esters containing an average of at least 2 OH groups per molecule are commercial products such as Lupranol Balance® (from BASF AG), Merginol® products (from Hobum Oleochemicals GmbH), Sovermol® products (from Cognis Deutschland GmbH & Co. KG) and Soyol® TM products (from USSC Co.).

Monofunctional starter compounds used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. Monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentantane-1,5-diol, methylpentanediols (for example 3-methylpentane-1,5-diol), hexane-1,6-diol; octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of ε-caprolactone. In mixtures of H-functional starters, it is also possible to use trihydric alcohols, for example trimethylolpropane, glycerol, trishydroxyethyl isocyanurate and castor oil.

The H-functional starter substances may also be selected from the substance class of the polyether polyols, especially those having a molecular weight $M_n$ in the range from 100 to 4000 g/mol, preferably 250 to 2000 g/mol. Preference is given to polyether polyols formed from repeat ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. Suitable polyether polyols formed from repeat propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E products from BASF SE; suitable homo-polypropylene oxides are, for example, the Pluriol® P products from BASF SE; suitable mixed copolymers of ethylene oxide and propylene oxide are, for example, the Pluronic® PE or Pluriol® RPE products from BASF SE.

The H-functional starter substances may also be selected from the substance class of the polyester polyols, especially those having a molecular weight $M_n$ in the range from 200 to 4500 g/mol, preferably 400 to 2500 g/mol. The polyester polyols used are at least difunctional polyesters. Preferably, polyester polyols consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether carbonate polyols. If polyether polyols are used to prepare the polyester ether polyols, preference is given to polyether polyols having a number-average molecular weight $M_n$ of 150 to 2000 g/mol.

In addition, the H-functional starter substances used may be polycarbonate polyols (for example polycarbonate diols), especially those having a molecular weight $M_n$ in the range from 150 to 4500 g/mol, preferably 500 to 2500, which are prepared, for example, by reaction of phosgene, dimethyl carbonate, diethyl carbonate or diphenyl carbonate and di- and/or polyfunctional alcohols or polyester polyols or polyether polyols. Examples of polycarbonate polyols can be found, for example, in EP-A 1359177. For example, polycarbonate diols used may be the Desmophen® C products from Bayer MaterialScience AG, for example Desmophen® C 1100 or Desmophen® C 2200.

It is likewise possible to use polyether carbonate polyols as H-functional starter substances. More particularly, polyether carbonate polyols which are prepared by the above-described process are used. To this end, these polyether carbonate polyols used as I-functional starter substances are prepared in a separate reaction step beforehand.

Preferred H-functional starter substances are alcohols of the general formula (V)

HO—(CH$_2$)$_x$—OH    (V)

where x is a number from 1 to 20, preferably an even number from 2 to 20. Examples of alcohols of formula (V) are ethylene glycol, butane-1,4-diol, hexane-1,6-diol, octane-1,8-diol, decane-1,10-diol and dodecane-1,12-diol. Further preferred H-functional starter substances are neopentyl glycol, trimethylolpropane, glycerol, pentaerythritol, reaction products of the alcohols of formula (I) with ε-caprolactone, e.g. reaction products of trimethylolpropane with ε-caprolactone, reaction products of glycerol with ε-caprolactone, and reaction products of pentaerythritol with ε-caprolactone. Preference is further given to using, as H-functional starter substances, water, diethylene glycol, dipropylene glycol, castor oil, sorbitol and polyether polyols formed from repeat polyalkylene oxide units.

More preferably, the H-functional starter substances are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, diethylene glycol, dipropylene glycol, glycerol, trimethylolpropane, di- and trifunctional polyether polyols, where the polyether polyol has been formed from a di- or tri-H-functional starter substance and propylene oxide or a di- or tri-H-functional starter substance, propylene oxide and ethylene oxide. The polyether polyols preferably have a number-average molecular weight $M_n$ in the range from 62 to 4500 g/mol and especially a number-average molecular weight $M_n$ in the range from 62 to 3000 g/mol, most preferably a molecular weight of 62 to 1500 g/mol. Preferably, the polyether polyols have a functionality of ≥2 to ≤3.

In a preferred embodiment of the invention, the polyether carbonate polyol is obtainable by addition of carbon dioxide and alkylene oxides onto H-functional starter substances using multimetal cyanide catalysts (DMC catalysts). The preparation of polyether carbonate polyols by addition of alkylene oxides and $CO_2$ onto H-functional starters using DMC catalysts is known, for example, from EP-A 0222453, WO-A 2008/013731 and EP-A 2115032.

DMC catalysts are known in principle from the prior art for homopolymerization of epoxides (see, for example, U.S. Pat. No. 3,404,109, U.S. Pat. No. 3,829,505, U.S. Pat. No. 3,941,849, and U.S. Pat. No. 5,158,922). DMC catalysts, which are described, for example, in U.S. Pat. No. 5,470,813, EP-A 700 949, EP-A 743 093, EP-A 761 708, WO-A 97/40086, WO-A 98/16310 and WO-A 00/47649, have a very high activity in the homopolymerization of epoxides and enable the preparation of polyether polyols and/or polyether carbonate polyols at very low catalyst concentrations (25 ppm or less). A typical example are the high-activity DMC catalysts described in EP-A 700 949, which as well as a double metal cyanide compound (e.g., zinc hexacyanocobaltate (III)) and an organic complex ligand (e.g., tert-butanol) also contain a polyether having a number-average molecular weight $M_n$ of greater than 500 g/mol.

The DMC catalyst is usually used in an amount of ≤1% by weight, preferably in an amount of ≤0.5% by weight, more preferably in an amount of ≤500 ppm and especially in an amount of ≤300 ppm, based in each case on the weight of the polyether carbonate polyol.

Component B) comprises polyether polyols having a hydroxyl number to DIN 53240 of ≥20 mg KOH/g to ≤250 mg KOH/g, preferably of ≥20 to ≤112 mg KOH/g and more preferably ≥20 mg KOH/g to ≤80 mg KOH/g and is free of carbonate units. The preparation of the compounds according to B) can be effected by catalytic addition of one or more alkylene oxides onto H-functional starter compounds.

Alkylene oxides (epoxides) used may be alkylene oxides having 2 to 24 carbon atoms. The alkylene oxides having 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Alkylene oxides used are preferably ethylene oxide and/or propylene oxide and/or 1,2-butylene oxide. Particular preference is given to using an excess of propylene oxide and/or 1,2-butylene oxide. The alkylene oxides can be supplied to the reaction mixture individually, in a mixture or successively. The copolymers may be random or block copolymers. If the alkylene oxides are metered in successively, the products (polyether polyols) produced contain polyether chains having block structures.

The H-functional starter compounds have functionalities of ≥2 to ≤6 and are preferably hydroxy-functional (OH-functional). Examples of hydroxy-functional starter compounds are propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea. Preferably, the starter compound used is 1,2-propylene glycol and/or glycerol and/or trimethylolpropane and/or sorbitol.

The polyether polyols according to B) preferably have a content of ≥0% to ≤40% by weight, more preferably ≥0% to ≤25% by weight of ethylene oxide.

Suitable isocyanate components include the readily industrially available polyisocyanates, for example tolylene 2,4- and 2,6-diisocyanate and any desired mixtures of these isomers ("TDI"); polyphenyl polymethylene polyisocyanates as prepared by aniline-formaldehyde condensation and subsequent phosgenation ("crude MDI"), and polyisocyanates having carbodiimide groups, urethane groups, allophanate groups, isocyanurate groups, urea groups or biuret groups ("modified polyisocyanates"), especially those modified polyisocyanates which derive from tolylene 2,4- and/or 2,6-diisocyanate or from diphenylmethane 4,4'- and/or 2,4'-diisocyanate. Preference is given to using, as polyisocyanate, at least one compound selected from the group consisting of tolylene 2,4- and 2,6-diisocyanate, diphenylmethane 4,4'- and 2,4'- and 2,2'-diisocyanate and polyphenyl polymethylene polyisocyanate ("polycyclic MDI").

It is of course additionally possible to use additives customary in flexible polyurethane foam production, such as stabilizers, catalysts, etc.

Further aspects and embodiments of the present invention are described hereinafter. They may be combined arbitrarily with one another, unless the opposite is clearly apparent from the context.

In one embodiment of the process of the invention, in the component reactive toward isocyanates, the total proportion of units originating from carbon dioxide in the polyols present is ≥2.0% by weight to ≤30.0% by weight, based on the total weight of the polyols present. This proportion is preferably ≥5.0% by weight to ≤25.0% by weight, more preferably ≥8.0% by weight to ≤20.0% by weight.

For production of the flexible polyurethane foams, the reaction components are reacted by the one-stage process known per se, often using mechanical equipment, for example that described in EP-A 355 000. Details of processing equipment which is also an option in accordance with the invention are described in Kunststoff-Handbuch [Plastics Handbook], volume VII, edited by Vieweg and Höchtlen, Carl-Hanser-Verlag, Munich 1993, for example on pages 139 to 265.

The flexible polyurethane foams can be produced as molded foams or else as slabstock foams. The invention therefore provides a process for producing the flexible polyurethane foams, the flexible polyurethane foams produced by these processes, the flexible slabstock polyurethane foams or flexible molded polyurethane foams produced by these processes, the use of the flexible polyurethane foams for production of moldings and the moldings themselves. The flexible polyurethane foams obtainable according to the invention find the following uses, for example: furniture cushioning, textile inserts, mattresses, automobile seats, headrests, armrests, sponges, foam films for use in automobile components, for example inner roof linings, door trim, seat covers and structural components.

In a further embodiment of the process of the invention, the polyols according to A) and B) are present in the following proportions by weight relative to one another: ≥20% by weight to ≤80% by weight, preferably ≥50% by weight to ≤80% by weight, more preferably ≥55% by weight to 80% by weight of A), ≤80% by weight to ≥20% by weight, preferably ≤50% by weight to ≥20% by weight, more preferably ≤45% by weight to ≥20% by weight of B).

In a further embodiment of the process of the invention, the flexible polyurethane foam has an indentation hardness (40% compression) to DIN EN ISO 1798 of ≥0.8 kPa to ≤12.0 kPa, preferably ≥2.0 kPa to ≤8.0 kPa.

In a further embodiment of the process according to the invention, the index is ≥85 to ≤125. Preferably, the index is within a range from ≥90 to ≤120. The index indicates the percentage ratio of the amount of isocyanate actually used to the stoichiometric amount of isocyanate groups, (NCO) amount, i.e. that calculated for the conversion of the OH equivalents.

$$\text{Index}=(\text{amount of isocyanate used}):(\text{amount of isocyanate calculated})\cdot 100 \quad\quad (VI)$$

In a further embodiment of the process of the invention, the reaction of the isocyanate component with the isocyanate-reactive component takes place in the presence of one or more catalysts. Catalysts used may be aliphatic tertiary amines (for example trimethylamine, triethylamine, tetramethylbutanediamine), cycloaliphatic tertiary amines (for example 1,4-diaza[2.2.2]bicyclooctane), aliphatic amino ethers (for example dimethylaminoethyl ether and N,N,N-trimethyl-N-hydroxyethylbisaminoethyl ether), cycloaliphatic amino ethers (for example N-ethylmorpholine), aliphatic amidines, cycloaliphatic amidines, urea, derivatives of urea (for example aminoalkylureas; see, for example, EP-A 0 176 013, especially (3-dimethylaminopropylamino) urea), and tin catalysts (for example dibutyltin oxide, dibutyltin dilaurate, tin(II) ethylhexanoate, tin ricinoleate).

In a further embodiment of the process of the invention, the reaction takes place in the presence of water as blowing agent. It is possible that further physical or chemical blowing agents are present, for example liquid carbon dioxide or dichloromethane.

In a further embodiment of the process of the invention, the isocyanate component comprises tolylene 2,4-, 2,6-diisocyanate (TDI), diphenylmethane 4,4'-, 2,4'-, 2,2'-diisocyanate and polyphenyl polymethylene polyisocyanate ("polycyclic MDI"). Preference is given to a tolylene diisocyanate isomer mixture composed of 80% by weight of 2,4- and 20% by weight of 2,6-TDI.

In a further embodiment of the process of the invention, the polyether carbonate polyol(s) according to A) has/have a hydroxyl number of ≥20 mg KOH/g to ≤250 mg KOH/g and is/are obtainable by copolymerization of ≥2.0% by weight to ≤30.0% by weight of carbon dioxide and ≥70% by weight to ≤98% by weight of propylene oxide in the presence of a hydroxy-functional starter molecule, for example trimethylolpropane and/or glycerol and/or propylene glycol and/or sorbitol. The hydroxyl number can be determined to DIN 53240.

In a further embodiment of the process of the invention, the polyol(s) according to B) has/have a hydroxyl number of ≥20 mg KOH/g to ≤80 mg KOH/g and is/are obtainable by copolymerization of ≥0% by weight to ≤40% by weight of ethylene oxide and ≥60% by weight to ≤100% by weight of propylene oxide in the presence of a hydroxy-functional starter molecule, for example trimethylolpropane and/or glycerol and/or propylene glycol and/or sorbitol. The hydroxyl number can be determined to DIN 53240.

In a further embodiment, the invention relates to a process according to any of the above embodiments, wherein the polyether carbonate polyol(s) A) has/have blocks of formula (VIII) having a ratio of e/f of 2:1 to 1:20.

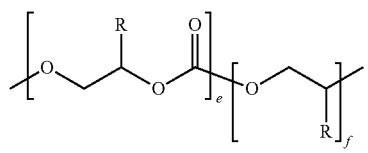

(VIII)

The present invention further relates to a flexible polyurethane foam obtainable by the process of the invention. The apparent density thereof to DIN EN ISO 3386-1-98 may be in the range from ≥10 kg/m³ to ≥150 kg/m³, preferably in the range from ≥15 kg/m³ to ≤60 kg/m³.

EXAMPLES

The present invention is elucidated further by the examples which follow, but without being restricted thereto. The abbreviations mean:
Polyol B-1: trifunctional polyether polyol based on glycerol having hydroxyl number 48 mg KOH/g, obtained by copolymerization of 12% by weight of ethylene oxide with 88% by weight of propylene oxide
Polyol A-1: trifunctional polyether carbonate polyol based on glycerol having hydroxyl number 50 mg KOH/g, obtained by copolymerization of 16% by weight of carbon dioxide with 84% by weight of propylene oxide. e/f ratio=1:3.6
Polyol A-2: trifunctional polyether carbonate polyol based on glycerol having hydroxyl number 50 mg KOH/g, obtained by copolymerization of 20.5% by weight of carbon dioxide with 79.5% by weight of propylene oxide, e/f ratio=1:2.8
Polyol A-3: trifunctional polyether carbonate polyol based on glycerol having hydroxyl number 49 mg KOH/g, obtained by copolymerization of 14% by weight of carbon dioxide with 86% by weight of propylene oxide, e/f ratio=1:4.1
Polyol A-4: trifunctional polyether carbonate polyol based on glycerol having hydroxyl number 51 mg KOH/g, obtained by copolymerization of 11.5% by weight of carbon dioxide with 88.5% by weight of propylene oxide, e/f ratio=1:4.9
Stabilizer 1: siloxane-based foam stabilizer, Tegostab® BF 2370, Evonik Goldschmidt Isocyanate 1: mixture of 80% by weight of tolylene 2,4- and 20% by weight of tolylene 2,6-diisocyanate, available under the Desmodur® T 80 name, Bayer MaterialScience AG
Catalyst 1: bis(2-dimethylaminoethyl) ether in dipropylene glycol, available as Addocat® 108, from Rheinchemie
Catalyst 2: tin(II) ethylhexanoate, available as Dabco® T-9, from Air Products Apparent density was determined to DIN EN ISO 3386-1-98.
Indentation hardness was determined to DIN EN ISO 3386-98 (at 40% deformation and 4th cycle).
Tensile strength and elongation at break were determined to DIN EN ISO 1798.
Hydroxyl number was determined to DIN 53240.
In each case, the $CO_2$ content, the hydroxyl number and the starter used were used to calculate the e/f ratio (see formula (VIII)) for each particular polyether carbonate polyol.

The rise (flow) capacity of a foaming reaction mixture delivers an important statement about the processability and quality of the raw materials used.

Flow capacity is generally defined as the distance that the foam that forms from a particular amount of reaction mixture with a fixed blowing agent content covers in an elongated hollow chamber within the setting time. In the present case, flow capacity is equivalent to the rise capacity of the foaming reaction mixture and is measured as "rise height".

The elongated model hollow body used is a metal flow tube which is filled by foaming in a vertical arrangement from the lower end. While the foam is rising, the rise height is registered as a function of time.

The metal tube (length: 145 cm; wall thickness: 2.5 cm; internal diameter: 9.5 cm) has two connections to the water bath which serve for thermostatic control. The temperature of the rise tube is thus kept at 42° C. Thereafter, a tubular polyethylene film is inserted, with one end pulled around the lower end of the tube. Also suspended in the rise tube is a disk on a thread with a counterweight, over a roller in such a way that the disk concludes with the lower end of the tube. The raw materials of the mixture to be foamed, in a spiral-wound paper cup with a sheet metal base that has been attached by crimping (140/137×96×1 mm) (from Brüggen & Söhne, Düren, Germany), are inserted immediately into the lower end of the rise tube until stopped by the protruding sheet metal base edge and fixed. While the foam is rising, the distance covered is determined at regular time intervals. The measurement is then repeated. There must be a wait time of at least 15 min between two measurements, in order that the rise tube heated by the foam can cool down to 42° C. The data from two measurements are averaged.

On the rise height-rise time diagram, it is possible to determine the rise height at the setting time, called the $h_A$ value.

After the measurement time has elapsed, the physical parameters of room temperature, tube temperature, foam pressure and barometric air pressure are detected automatically. In order to compensate for the influence of barometric air pressure for the foam height, the measurement data for the foam height and the barometric air pressure measured are used to convert the foam height for the standard air pressure of 1013 hPa by the following formula (VII):

$$\text{Height}_{corr} = \text{air pressure}_{measured} * \text{height}_{measured}/1013 \quad \text{(VII)}$$

Polyurethane foams were produced according to the recipes specified in the table below. The proportions of the components are listed in parts by weight. Examples no. 1, 2, 4 and 7 and 8 are comparative examples (table 1: (comp.)); examples 3, 5 and 6 are inventive examples. The figure "$CO_2$ content in the mixture" refers to the $CO_2$ content, expressed in % by weight, in the polyol mixture reactive toward isocyanates (polyols A, B, C, D, E according to recipe).

TABLE 1

Flexible polyurethane foams

| Example | 1 (comp.) | 2 (comp.) | 3 | 4 (comp.) | 5 | 6 | 7 (comp.) | 8 (comp.) |
|---|---|---|---|---|---|---|---|---|
| Polyol B-1 | 100 | | 25 | | 50 | 35 | 10 | |
| Polyol A-1 | | 100 | | | | 65 | | |
| Polyol A-2 | | | 75 | | | | 90 | |
| Polyol A-3 | | | | 100 | 50 | | | |
| Polyol A-4 | | | | | | | | 100 |
| Stabilizer 1 | 1.2 | 1.2 | 1.2 | 1.2 | 1.2 | 1.2 | 1.2 | 1.2 |
| Catalyst 1 | 0.12 | 0.12 | 0.12 | 0.12 | 0.12 | 0.12 | 0.12 | 0.12 |
| Catalyst 2 | 0.18 | 0.18 | 0.18 | 0.18 | 0.18 | 0.18 | 0.18 | 0.18 |
| Water | 4.5 | 4.5 | 4.5 | 4.5 | 4.5 | 4.5 | 4.5 | 4.5 |
| Isocyanate 1 | 55.0 | 55.3 | 55.2 | 55.2 | 55.2 | 55.7 | 55.2 | 55.2 |
| Index | 108 | 108 | 108 | 108 | 108 | 108 | 108 | 108 |
| Rise height in the tube [cm] | 77.1 | 69.9 | 72.1 | 70.6 | 73.8 | 76.7 | 68.9 | 70.2 |
| Apparent density [kg/m$^3$] | 28.4 | 33.0 | 33.0 | 30.4 | 27.0 | 32.5 | 45.6 | 36.7 |
| Indentation hardness [kPa] | 4.8 | 5.7 | 6.0 | 5.1 | 4.7 | 5.4 | 8.2 | 6.1 |
| Tensile strength [kPa] | 117 | 100 | 99 | 87 | 96 | 93 | 120 | 85 |
| Elongation at break [%] | 209 | 135 | 121 | 124 | 148 | 137 | 90 | 104 |
| Compression set [%] | 7.3 | 6.3 | 7.4 | 5.4 | 6.7 | 6.9 | 12.4 | 7.8 |
| CO$_2$ content in the polyol mixture [%] | 0 | 16 | 15 | 14 | 10 | 10.5 | 18 | 11.5 |

The results demonstrate that, with the polyol mixture of the invention in examples 3, 5 and 6, better flow characteristics are observed than with the polyether carbonate polyols or mixtures of examples 2, 4, 7 and 8. In addition, the foams obtained in inventive examples 3 also have a higher indentation hardness than those in comparative examples 2 and 4. Comparative example 1, which does not contain any polyether carbonate polyol, has good flow characteristics.

The invention claimed is:

1. A process for producing flexible polyurethane foams which comprises reacting an isocyanate component with a component reactive toward isocyanates, wherein the component reactive toward isocyanates comprises the following constituents:
   A) ≥50 to ≤80% by weight of a polyether carbonate polyol having a hydroxyl number to DIN 53240 of ≥20 mg KOH/g to ≤250 mg KOH/g, obtained by copolymerization of
      ≥2% by weight to ≤30% by weight of carbon dioxide and ≥70 by weight to ≤98% by weight of one or more alkylene oxides,
      in the presence of one or more H-functional starter molecules having an average functionality of ≥2 to ≤6,
   where the polyether carbonate polyol is free of terminal alkylene oxide blocks, and
   B) ≤50 to ≥20% by weight of a polyether polyol having a hydroxyl number to DIN 53240 of ≥20 mg KOH/g to ≤250 mg KOH/g, the polyether polyol being free of carbonate units.

2. The process as claimed in claim 1, wherein the component reactive toward isocyanates comprises the following constituents:
   A) ≥50 to ≤80% by weight of a polyether carbonate polyol having a hydroxyl number to DIN 53240 of ≥20 mg KOH/g to ≤250 mg KOH/g, obtained by copolymerization of
      ≥2% by weight to ≤30% by weight of carbon dioxide and ≥70% by weight to ≤98% by weight of one or more alkylene oxides,
      in the presence of one or more H-functional starter molecules having an average functionality of ≥2 to ≤4,
   where the polyether carbonate polyol is free of terminal alkylene oxide blocks, and
   B) ≤50 to ≥20% by weight of a polyether polyol having a hydroxyl number to DIN 53240 of ≥20 mg KOH/g to ≤250 mg KOH/g, the polyether polyol being free of carbonate units.

3. The process as claimed in claim 1, wherein the component reactive toward isocyanates comprises the following constituents:
   A) ≥55 to ≤80% by weight of a polyether carbonate polyol having a hydroxyl number to DIN 53240 of ≥20 mg KOH/g to ≤250 mg KOH/g, obtained by copolymerization of
      ≥2% by weight to ≤30% by weight of carbon dioxide and ≥70% by weight to ≤98% by weight of one or more alkylene oxides,
      in the presence of one or more H-functional starter molecules having an average functionality of ≥2 to ≤3,
   where the polyether carbonate polyol is free of terminal alkylene oxide blocks, and
   B) ≤45 to ≥20% by weight of a polyether polyol having a hydroxyl number to DIN 53240 of ≥20 mg KOH/g to ≤250 mg KOH/g, the polyether polyol being free of carbonate units.

4. The process as claimed in claim 1, wherein component A) is obtained by
   (α) an H-functional starter substance or a mixture of at least two H-functional starter substances is initially charged and any water and/or other volatile compounds are removed by elevated temperature and/or reduced pressure, with addition of the DMC catalyst to the H-functional starter substance or to the mixture of at least two H-functional starter substances before or after any water and/or other volatile compounds are removed by elevated temperature and/or reduced pressure,
   (β) activation is accomplished by adding a portion, based on the total amount of alkylene oxides used in the activation and copolymerization, of one or more alkylene oxides to the mixture resulting from step (α), where this portion of alkylene oxide may optionally be added in the presence of $CO_2$ and where the temperature spike which then occurs due to the exothermic chemical reaction that follows and/or a pressure drop in the reactor is awaited in each case, and where step (β) for activation may also be repeated, (γ) one or more of the alkylene oxides and carbon dioxide are added to the mixture resulting from step (β), where the alkylene oxides used in step (γ) may be the same as or different than the alkylene oxides used in step (β), and where no further alkoxylation step follows on after step (γ).

5. The process as claimed in claim 1, wherein one or more alkylene oxides in component A) is ethylene oxide, propylene oxide and/or 1,2-butylene oxide.

6. The process as claimed in claim 5, wherein component B) includes ≥0% to ≤40% by weight of ethylene oxide units.

7. The process as claimed in claim 1, wherein the component reactive toward isocyanates includes ≥50 to ≤80% by weight of A) and ≤50 to ≥20% by weight of B).

8. The process as claimed in claim 1, wherein in the component reactive toward isocyanates includes ≥55 to ≤80% by weight of A) and ≤45 to ≥20% by weight of B).

9. The process as claimed in claim 1, wherein, in the component reactive toward isocyanates, the total proportion of units originating from carbon dioxide in the polyols present is ≥5.0% by weight to ≤25.0% by weight, based on the total weight of the polyols present.

10. The process as claimed in claim 1, wherein the polyether carbonate polyol A) has a hydroxyl number to DIN 53240 of ≥25 mg KOH/g to ≤90 mg KOH/g.

11. The process as claimed in claim 1, wherein the polyether polyol B) has a hydroxyl number to DIN 53240 of ≥20 mg KOH/g to ≤80 mg KOH/g.

12. The process as claimed in claim 1, wherein the reaction takes place in the presence of water as a blowing agent.

13. The process as claimed in claim 1, wherein the isocyanate component comprises tolylene 2,4-, 2,6-diisocyanate (TDI), diphenylmethane 4,4'-, 2,4'-, 2,2'-diisocyanate (MDI) and/or polyphenyl polymethylene polyisocyanate ("polycyclic MDI").

14. The process as claimed in claim 1, wherein the polyether carbonate polyol (A) includes blocks of formula (VIII) having an e/f ratio of 2:1 to 1:20,

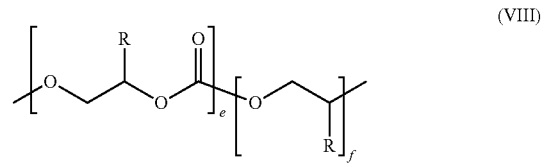

(VIII)

wherein
R is an organic radical which optionally contains at least one heteroatom
e is an integer and
f is an integer.

15. The process as claimed in claim 14, wherein R is an alkyl, alkylaryl or aryl, which optionally contains O, S or Si and the ratio of e/f is from 1.5:1 to 1:10.

* * * * *